Jan. 22, 1963   G. CAPPIELLO   3,074,730
REMOVABLE DUST GUARD ASSEMBLY
Filed Jan. 6, 1961   3 Sheets-Sheet 1
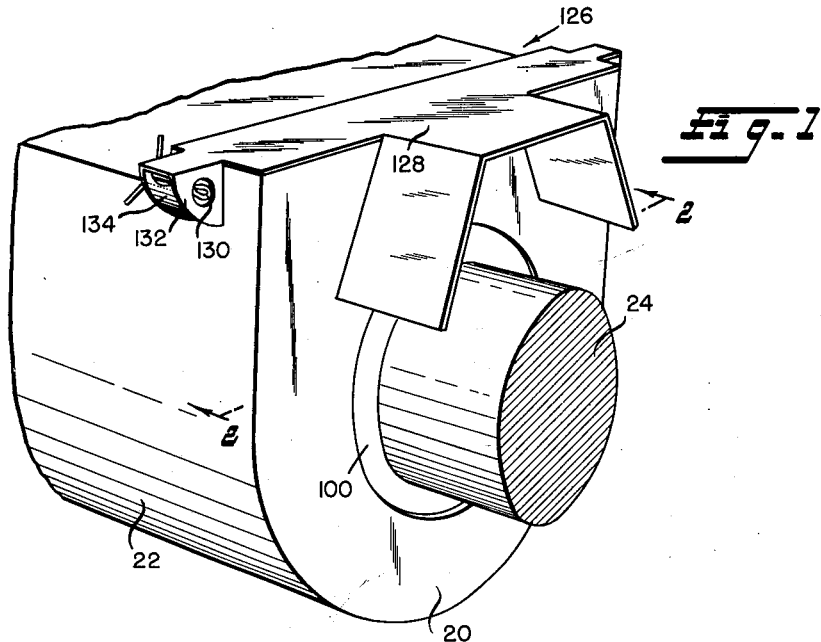
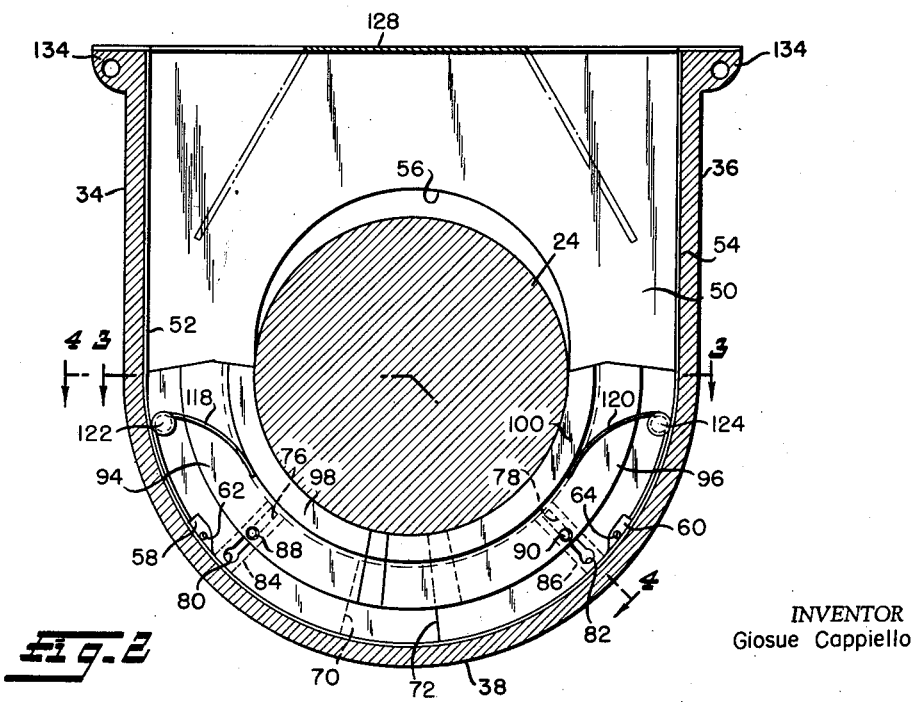
INVENTOR
Giosue Cappiello
BY *Strauch, Nolan + Neale*
ATTORNEYS

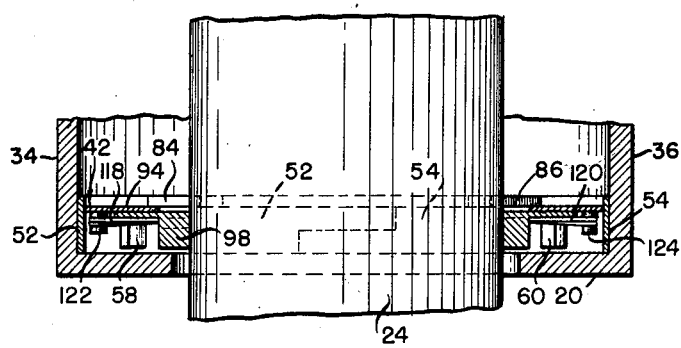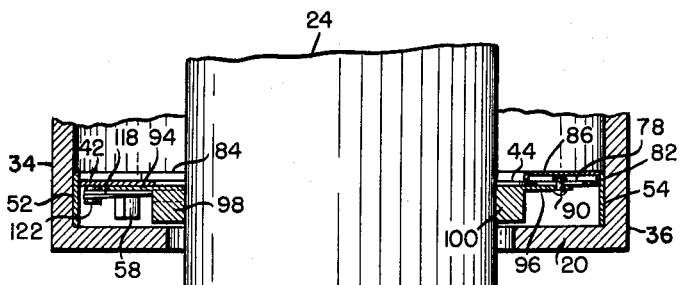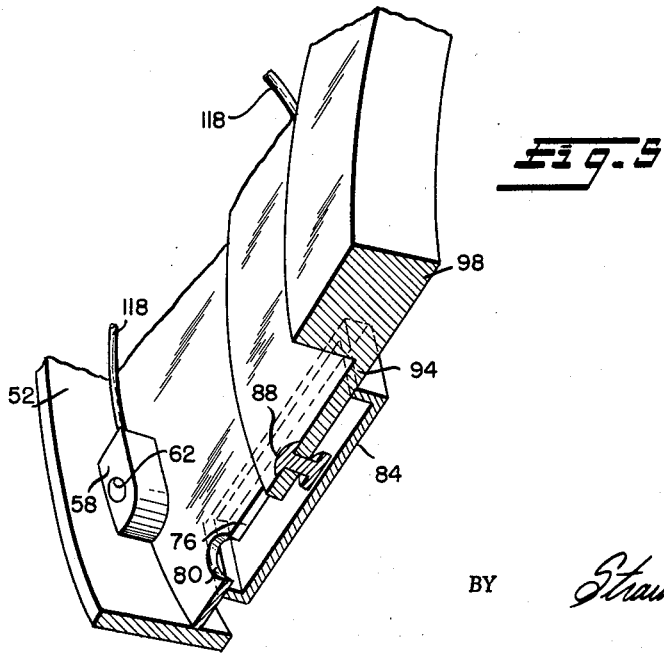

Jan. 22, 1963 G. CAPPIELLO 3,074,730
REMOVABLE DUST GUARD ASSEMBLY
Filed Jan. 6, 1961 3 Sheets-Sheet 3
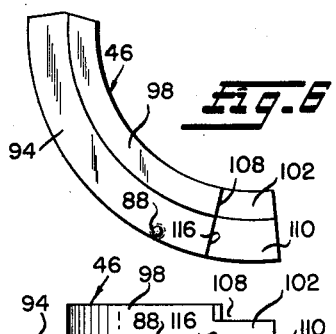
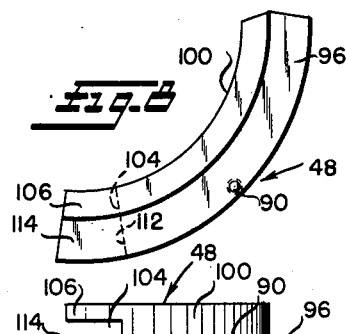
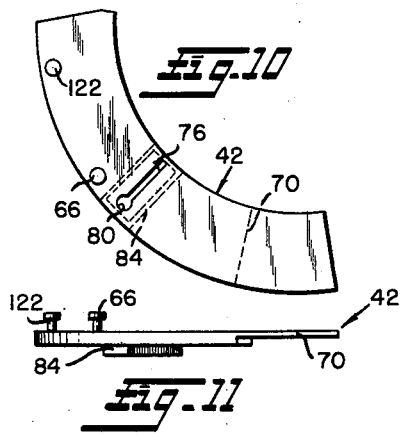
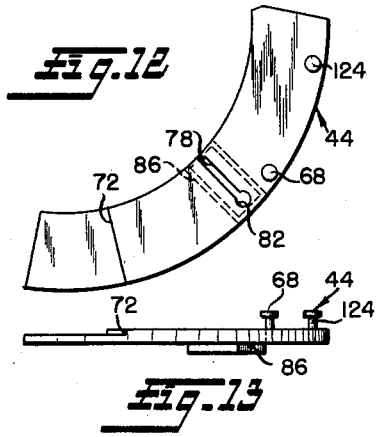
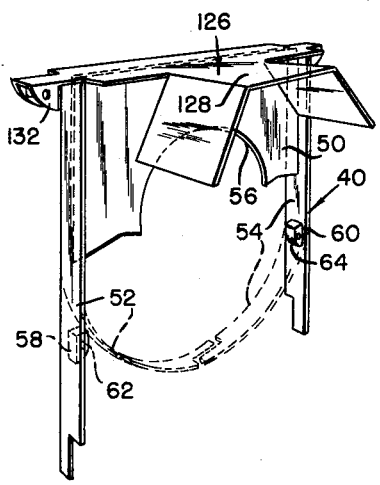
INVENTOR
Giosue Cappiello
BY Strauch, Nolan + Neale
ATTORNEYS

United States Patent Office 3,074,730
Patented Jan. 22, 1963

1

3,074,730
REMOVABLE DUST GUARD ASSEMBLY
Giosue Cappiello, 125 Rosette St., New Haven, Conn.
Filed Jan. 6, 1961, Ser. No. 81,017
5 Claims. (Cl. 277—130)

This invention relates to journal box appliances and more particularly to lubrication seals and dust guards for railway car journal boxes.

The great majority of freight cars are presently equipped with plain axle bearings because of the low initial cost of such bearings as compared with roller bearings and other available types of bearings. Plain bearings, because of their simple, rugged construction are inherently capable of providing long trouble-free service if they are properly lubricated and protected from dust and dirt and other foreign matter. In the past lubrication of such bearings has been effected by partially filling the journal box with a fluid lubricant which is transferred to the axle by cotton waste packed around the axle. While this practice has been widely adopted, it has not been regarded as satisfactory and lubrication problems have continued to cause premature bearing failure which obviously substantially increase operating costs and which occasionally produce disastrous results since bearing failure can cause de-railment of the train.

Despite these difficulties, waste packing has continued to be used primarily because of the lack of a practical seal and dust guard unit which is required to retain and protect the supply of lubricant which must be provided in the journal box if the waste packing is eliminated. All presently known prior attempts to provide such a unit have been unsuccessful and have failed to meet the exacting commercial requirements. Prior seals and dust guards have been formed of fiber or plywood riveted or stapled together and inserted in the dust guard cavity cast in the journal box. These prior wood or fiber units have proved to be, at best, a temporary expedient. These and other proposals have not been satisfactory because they do not fit snugly around the journal either initially or after they have been subject to normal wear.

Most of the prior units have also been rigid and have thus been subject to breakage upon movement of the journal with respect to the journal box. Also, many prior seals have been unsatisfactory because they could not be easily removed for replacement thus necessitating expensive and time consuming removal of the truck from the car and disengagement of the entire truck assembly. In many cases the construction of the unit was such that it could not be removed without disassembling the unit or virtually destroying it.

With the foregoing considerations in mind, it is the principal purpose and object of the present invention to provide improved combined dust guard and lubricant seals for railway journal boxes which overcome the disadvantages of the prior constructions and permit trouble-free lubrication for extended periods of time.

It is a further object of the present invention to provide relatively simple appliances for insertion in the dust guard cavity of the journal box housing which effectively retain a solid or semi-solid lubricant in the journal box for an indefinite period of time thus permitting the utilization of lubricants superior to those now in use.

It is a further object to provide improved sealing units for railway journal boxes which may be easily removed for inspection or maintenance without removal or disassembly of the truck.

It is an additional object of the present invention to provide improved sealing appliances for railway journal boxes which continually conform to the shape and position of the axle and which automatically adapt to the movements of the axle and which are not subject to damage due to the normal vibration present at the axle and which automatically adjust for wear to provide a seal which has continuing effectiveness even after an extended period of use.

It is also an object of the present invention to provide improved sealing units for railway journal boxes in which the bearing surfaces are provided on members which may be removed and replaced in the field thus obviating the necessity for employing skilled technicians and shop facilities.

It is an additional object of the present invention to provide improved sealing appliances for railway journal boxes which are so constructed as to permit the performance of maintenance operations on the main bearing without damage to the sealing unit.

It is a further object of the present invention to provide improved sealing units for railway journal boxes which provide uniquely effective protection against the entry of dust, dirt and other foreign matter into the lubricant chamber.

In attaining these and other objects, the present invention provides a combined lubricant seal-dust guard unit comprising a main support frame structure having yieldable side portions adapted to extend around the opposite sides of the axle, each of the side portions carrying a unique dual floating shoe construction, the shoes carried by the opposite side portions cooperating when installed to provide an essentially free-floating seal and dust guard unit resiliently urged into operative position. While, as indicated above, the units of the present invention perform the dual function of preventing the escape of lubricant and preventing the entry of dust, dirt and other foreign matter into the journal box, the units will, for convenience, be termed "dust guards" in the following description and claims.

Additional objects will become apparent as the description proceeds in connection with the accompanying drawings in which:

FIGURE 1 is a perspective view of the appliance of the present invention installed in a conventional railway car journal housing box;

FIGURE 2 is a vertical section taken along lines 2—2 of FIGURE 1;

FIGURES 3 and 4 are transverse sections taken along lines 3—3 and 4—4, respectively, of FIGURE 2;

FIGURE 5 is an enlarged fragmentary perspective view of a portion of the unit of the present invention showing details of construction;

FIGURE 6 is a front elevation of one of the two main sealing members shown removed from the assembly;

FIGURE 7 is a bottom plan view of the unit of FIGURE 6;

FIGURE 8 is a front elevation of other of the main sealing members;

FIGURE 9 is a bottom plan view of the unit of FIGURE 8;

FIGURE 10 is a front elevation of one of the two complementary floating support members shown removed from the assembly;

FIGURE 11 is a bottom plan view of th unit of FIGURE 10;

FIGURE 12 is a front elevation of the other of the two complementary floating support members shown removed from the assembly;

FIGURE 13 is a bottom plan view of the unit of FIGURE 12; and

FIGURE 14 is a view of another of the floating support assemblies shown removed from the journal box housing and disassembled from the remainder of the structure.

Referring now more particularly to the drawings, FIGURE 1 shows the dust guard of the present invention installed in the dust guard cavity 20 which is formed as an integral part of the conventional railway journal housing box 22. In accordance with conventional practice, the axle 24 extends through aligned openings formed, respectively, in the outer and inner walls of the dust guard cavity 20 into the main journal box housing which is provided with a plain journal bearing, not shown. Inasmuch as the journal box housing and the components contained therein are in all respects conventional and form no part of the present invention, they will not be further described.

As best shown in FIGURES 1 and 2, the dust guard cavity 20 is in the form of an upwardly open U having straight parallel side portions 34 and 36 and an arcuate bottom portion 38 formed concentrically with the longitudinal axis of the axle 24.

The dust guard of the present invention is wholly contained within the dust guard cavity and is adapted to be inserted into and removed therefrom by vertical movement through the opening formed at the top of the dust guard cavity. The major components of the dust guard include the main support structure indicated generally at 40 and shown separately in FIGURE 14; the outer support shoes or guard members indicated generally at 42 and 44 shown separately in FIGURES 10 and 11 and 12 and 13, respectively, and the inner seal members indicated generally at 46 and 48 shown separately in FIGURES 6—7 and 8—9, respectively.

The support structure 40 comprises a flat web member 50 of generally rectangular form to the opposite lateral edges of which are welded flexible metal or plastic strips 52 and 54, which may be termed spring fingers. When the unit is removed from the assembly as shown in FIGURE 14 the strips 52 and 54 are substantially straight and when it is inserted into the dust guard cavity, the strips assume the dotted line form shown in FIGURE 14. The dimensions of the support structure are such that, as shown in FIGURE 2, it fits snugly within the dust guard cavity, the free edges of the strips 52 and 54 occupy the position shown in dotted lines in FIGURE 14, the upper edge of the web member 50 will be substantially flush with the top edge of the dust guard cavity and the edge of the arcuate opening 56 formed centrally in the web member 50 will be spaced slightly above the adjacent surface portion of the axle 24 for a purpose to appear.

Welded or otherwise suitably secured to the inner surfaces of the strips 52 and 54 are mounting blocks 58 and 60 which are provided with bores 62 and 64 for the reception of pivot pins 66 and 68 carried by the respective guard members 42 and 44. When the unit is installed in the dust guard cavity as shown in FIGURE 2, the outer peripheries of the guard members 42 and 44 conform closely to the inner surface of the resilient strips 52 and 54, respectively, the inner edges of the members 42 and 44 are spaced a substantial distance from the adjacent surface of the axle 24, the upper ends of the members 42 and 44 are disposed slightly above the centerline of the axle and the lower ends overlap.

As best shown in FIGURES 11 and 13, the adjacent end portions of the guard members 42 and 44 are cut away as at 70 and 72, respectively, to facilitate the overlap at their adjacent end edges.

As best shown in FIGURES 5, 11 and 12, the floating guard members 42 and 44 are provided with slots 76 and 78, respectively, which extend generally radially of the axle 24 and are provided at their outer ends with enlarged portions 80 and 82, respectively. On one side the area surrounding the slots 76 and 78 is enclosed by rectangular box structures 84 and 86 which prevent the passage of lubricant through the slots.

Slidably received in the slots 76 and 78 are pivot pins 88 and 90 carried by the respective arcuate seal members 46 and 48 adjacent to their outer arcuate edges. The outer ends of the pins 88 and 90 are provided with enlarged heads which pass freely through the enlarged openings 80 and 82 but are larger than the slots 76 and 78 to retain the parts in assembled relation. While the bearing members 46 and 48 may be made of a number of materials, they are preferably of one-piece cast construction fabricated from a bearing bronze alloy.

The bearing members are provided with radially extending relatively thin fin portions 94 and 96, respectively, formed integrally with the relatively thickened bearing sections 98 and 100, the inner peripheral surfaces of which are formed on substantially the same radius as the outer surface of the axle 24. The parts are so dimensioned that when they are installed as shown in FIGURE 2, their upper ends are disposed slightly above the centerline of the axle 24 and their lower ends are overlapped with a unique double tongue and groove construction to prevent the passage of lubricant outwardly or the passage of dirt inwardly.

This construction includes a tongue 102 on the bearing portion of the member 46 which extends into a corresponding groove 104 in the bearing portion of the member 48, a tongue 106 on the bearing member 48 which extends into a corresponding groove 108 on the bearing member 46, a tongue 110 on the fin portion of the member 46 which extends into a groove 112 on the fin portion of the member 48, and a tongue 114 on the member 48 which extends into a cut away portion 116 on the member 46. This double overlapping tongue and groove construction thus provides an effective labyrinth seal.

The bearing members 46 and 48 are maintained in intimate contact with the surface of the axle 24 by wire springs 118 and 120 which are mounted on pins 122 and 124 carried by the respective outer guard members 42 and 44. The springs 118 and 120 each have one arm bearing against the outer surface of the bearing portion of the bearing members and another arm bearing against the inner periphery of the respective strip members 52 and 54.

The assembly is completed by a sheet metal dust cover 126 which has a flat portion covering the open top of the dust guard cavity and a lateral extension 128 extending over the top of the axle 24 in the space between the dust guard cavity and the wheel (not shown) carried by the axle to afford further protection to the seal against the entry of dust, dirt and other foreign matter. Cover 126 is detachably secured in place by cotter pins 130 which extend through aligned openings in attaching portions 132 of the cover 126 and ears 134 welded onto or formed integrally with the outer periphery of the housing 22.

The entire unit may be installed in or removed from the dust guard cavity in a matter of seconds without special tools or the use of special techniques which require the training of maintenance personnel. To install the unit it is necessary merely to push the unit vertically downwardly into the dust guard cavity until its top portion is essentially flush with the top of the dust guard cavity. The unit is then securely held in place by installation of the cover 126 which is held in place by the cotter pins 130. As the unit is being installed, the bearing members ride radially outwardly in the radial slots 76 and 78 in the outer guard members 42 and 44 against the relatively light resistance of the springs 118 and 120. The bearing members thus pass freely past the axle 24 not only because of the sliding action of the bearing members with respect to the outer guard members but also because of the free pivotal action of both the outer guard members and the bearing members about their respective pivot pins. The overlap of all the parts effected at the bottom of the seal is effected automatically without special adjustment.

The unit may be removed for inspection or replacement simply by removing the cover 126 and lifting the entire unit vertically out of the dust guard cavity. If inspection indicates that replacement of the bearing members is desirable, it is necessary only to slide the pivot pins 88 and 90 of the respective bearing members along the slots in the outer guard members until the enlarged portions of the slots are reached at which time the bearing members may freely be disengaged from the remainder of the assembly. A replacement bearing member can be installed by the reverse of this procedure. The entire operation can be performed in a matter of seconds by a mechanic of ordinary competence and no tools of any kind are required.

The compound sliding and double pivot action of the seal and guard members not only facilitates quick and easy installation and removal of the unit, but also assures the maintenance of a tight seal under all operating conditions. For example, as is well known, the axle moves vertically to some extent with respect to the journal box housing and the vertical movement is often accompanied by vibration. Either of these movements or the vertical change in position of the axle after normal bearing wear would quickly destroy any bearing assembly which is rigidly mounted. In the unit of the present invention all such movements are freely accommodated by the sealing structure and a considerable range of movement is provided for not only by the unique mounting of the bearing assemblies but also by the clearance provided between the web member 50 and the upper surface of the axle 24. It is also to be noted that engagement pressure between the bearing members and the axle can be selected within a wide range by utilization of springs 118 and 120 providing the desired characteristics. It should also be pointed out that end clearances are deliberately provided between all of the parts at the bottom of the seal. Accordingly, as the axle moves vertically upward at the journal bearing becomes worn, the seal members on the associated support structures are free to follow the axle to preserve the integrity of the seal at the surface of the axle as well as between the ends of the bearing members and the outer guard units.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A dust guard assembly for the portion of an axle extending through the dust guard cavity of a journal box comprising a support structure having independent spring fingers extending around the lower portion of said axle within said dust guard cavity at opposite sides of said axle in contact with the wall of said dust guard cavity, outer guard members pivotally carried by said fingers, the outer surfaces of said outer guard members being in contact with said spring fingers and the inner surfaces of said guard members being radially spaced from said axle, sealing members having surfaces adapted to sealingly engage said axle, means supporting said sealing members on said outer guard members in the space between said guard members and said axle for pivotal movement and for bodily displacement radially of said axle, and means resiliently urging said sealing members into sealing contact with said axle.

2. A dust guard assembly for the portion of an axle extending through the dust guard cavity of a journal box comprising a support structure having independent spring fingers extending around the lower peripheral portion of said axle within said dust guard cavity at opposite sides of said axle and in contact with the wall of said dust guard cavity, a web on said support structure extending from the top of said cavity to the region of the upper portion of said axle, outer guard members pivotally carried by said fingers, said outer guard members having outer surfaces in contact with said spring fingers and having inner surfaces spaced from said axle, sealing members pivotally carried by said outer guard members in the space between said outer guard members and said axle, said sealing members having surfaces adapted to sealingly engage said axle, and means resiliently urging said sealing members into engagement with said axle.

3. A dust guard assembly for the portion of an axle extending through the dust guard cavity of a journal box comprising a support structure having independent spring fingers extending around the lower peripheral portion of said axle within said dust guard cavity at opposite sides of said axle and in contact with a wall of said dust guard cavity, outer guard members pivotally carried by said fingers, said outer guard members having outer surfaces contacting said spring fingers and having inner surfaces spaced from said axle, sealing members having surfaces adapted to sealingly engage said axle, pins on said sealing members extending through radially extending slots on said guard members to support said sealing members in the space between said guard members and said axle for pivotal movement and for bodily displacement radially of said axle, and means resiliently urging said sealing members radially inwardly of said axle into sealing relation with said axle.

4. A dust guard assembly for the portion of an axle extending through the dust guard cavity of a journal box comprising a support structure having independent spring fingers extending around the lower peripheral portion of said axle within said dust guard cavity at opposite sides of said axle and in contact with the wall of said dust guard cavity, arcuate outer guard members pivotally carried by said fingers, one end of each of said guard members being disposed adjacent the level of the axis of said axle and the opposite ends of said guard members being overlapped adjacent the lowermost portion of said axle and the inner edges of said guard members being radially spaced from said axle and the outer surfaces of said guard members being in contact with said spring fingers, a pair of sealing members mounted on the respective guard members for movement pivotally of said guard members and radially of said axle and positioned in the radial space between said guard members and said axle, means resiliently urging said sealing members against said axle, said sealing members having sealing surfaces adapted to sealingly engage at least that portion of the axle lying below its longitudinal axis, and the adjacent ends of said sealing members being overlapped in the region adjacent the lowermost portion of said axle.

5. A dust guard assembly for the portion of the axle extending through the dust guard cavity of a journal box, the top of said cavity being open, said dust guard assembly being adapted to be inserted and removed from said cavity while said axle is installed, comprising a plate adapted to extend substantially across said cavity and having an opening adapted to surround only the upper portion of said axle, a pair of spring fingers carried by said plate along its opposite marginal edges and extending downwardly therefrom around the lower portions of said axle, said spring fingers engaging the wall of said dust guard cavity and having their ends closely adjacent in the region of the bottom of said dust guard cavity, outer guard members pivotally carried by said fingers, the inner surfaces of said guard members being spaced from said axle and the outer surfaces of said guard members being in contact with said spring fingers, sealing members having surfaces adapted to sealingly engage said axle at opposite sides thereof, means mounting said sealing members on said guard members in the space between said guard members and said axle for pivotal movement and for bodily displacement radially of said axle, and means resiliently urging said sealing members radially inwardly of said axle into sealing relation with the lower portions of said axle, the mounting of said sealing members on said guard members being such as to permit said sealing members to retract radially of said axle to clear said axle and permit the removal of said dust guard assembly from said dust guard cavity when said axle is installed.

References Cited in the file of this patent

UNITED STATES PATENTS

| | | | |
|---|---|---|---|
| 685,382 | Johnson | Oct. 29, | 1901 |
| 2,070,865 | Rowe | Feb. 16, | 1937 |
| 2,103,555 | Rowe | Dec. 28, | 1937 |
| 2,251,195 | Meunier | July 29, | 1941 |
| 2,638,363 | Bryant | May 12, | 1953 |
| 2,935,344 | Bryant | May 3, | 1960 |